United States Patent [19]

Marra

[11] 4,302,495
[45] Nov. 24, 1981

[54] NONWOVEN FABRIC OF NETTING AND THERMOPLASTIC POLYMERIC MICROFIBERS

[75] Inventor: Joseph V. Marra, Wilmington, Del.

[73] Assignee: Hercules Incorporated, Wilmington, Del.

[21] Appl. No.: 178,064

[22] Filed: Aug. 14, 1980

[51] Int. Cl.³ .............................................. B32B 5/12
[52] U.S. Cl. .................................. 428/110; 428/198; 428/247; 428/255; 428/284; 428/286; 428/296; 428/297; 428/302; 428/303; 428/903
[58] Field of Search .............. 428/195, 196, 198, 109, 428/110, 247, 255, 297, 303, 903, 302, 296, 284, 286

[56] References Cited

U.S. PATENT DOCUMENTS

| | | | |
|---|---|---|---|
| 3,676,242 | 7/1972 | Prentice | 156/62.4 |
| 3,715,251 | 2/1973 | Prentice | 156/62.8 |
| 3,795,571 | 3/1974 | Prentice | 428/296 |
| 3,849,241 | 11/1974 | Buten et al. | 428/137 |
| 3,914,365 | 10/1975 | Kim et al. | 156/167 |
| 3,957,554 | 5/1976 | Sunden | 156/62.6 |
| 4,020,208 | 4/1977 | Mercer et al. | 428/255 |
| 4,041,203 | 8/1977 | Brock et al. | 428/296 |
| 4,042,740 | 8/1977 | Kraieger | 428/903 |
| 4,059,713 | 11/1977 | Mercer | 428/112 |
| 4,078,124 | 3/1978 | Prentice | 428/198 |
| 4,100,319 | 7/1978 | Schwartz | 428/296 |
| 4,103,058 | 7/1978 | Humbeck | 428/903 |
| 4,109,353 | 8/1978 | Mitchell et al. | 428/296 |
| 4,118,531 | 10/1978 | Hauser | 428/296 |
| 4,139,245 | 2/1979 | McCloskey | 308/26 |
| 4,140,826 | 2/1979 | Lui | 428/113 |
| 4,144,368 | 3/1979 | Kim et al. | 428/255 |
| 4,146,663 | 3/1979 | Ikedo et al. | 428/298 |
| 4,152,479 | 5/1979 | Larsen | 428/255 |
| 4,196,245 | 4/1980 | Kitson et al. | 428/198 |
| 4,207,375 | 6/1980 | Kim et al. | 428/286 |

*Primary Examiner*—James J. Bell
*Attorney, Agent, or Firm*—Joshua W. Martin, III

[57] ABSTRACT

A composite nonwoven fabric-like laminate which includes an integrated mat of polymeric microfibers having a diameter of less than 30 microns and a layer of nonwoven linearly oriented thermoplastic netting, the mat and netting being either continuously bonded or spot-bonded to produce a laminate with the desired properties.

10 Claims, 5 Drawing Figures

NONWOVEN FABRIC OF NETTING AND THERMOPLASTIC POLYMERIC MICROFIBERS

BACKGROUND OF THE INVENTION

This invention relates generally to nonwoven fabrics and, more particularly to a family of nonwoven fabrics which are formed by combining a melt-blown polypropylene mat and directionally oriented thermoplastic netting. These nonwoven fabrics have a unique combination of properties including strength and precisely controlled porosity.

DESCRIPTION OF THE PRIOR ART

Nonwoven fabrics have been produced by combining an integrated mat of discontinuous thermoplastic polymeric microfibers with nonuniform porous reinforcing scrims of spunbonded fabrics. Prior art workers have sought to incorporate a number of critical physical properties in fabrics for use in surgical gowns, drapes, etc. These properties include desirable fabric-like characteristics, adequate strength, textile-like capability, water repellent capability, desirable surface abrasion characteristics, and high bacteria strikethrough resistance. Exemplary prior art fabrics are taught in U.S. Pat. No. 4,041,203 to Brock et al, issued Aug. 9, 1977.

Other nonwoven fabrics have been produced by combining an integrated mat of melt-blown fibers with an apertured film, or with both apertured film and spunbonded fabric. Exemplary composite nonwoven fabrics are taught in U.S. Pat. No. 4,196,245 to Kitson et al, issued Apr. 1, 1980. This patent teaches a composite nonwoven fabric including at least two hydrophobic plies of microfine fibers and at least one nonwoven cover layer which may be an apertured film, a spunbonded ply or an air laid, wet laid or carded ply of fibers. The cover ply is used to add strength to the fabric and for surgical items, to provide surface stability, i.e., resistance to abrasion and pilling. This nonwoven fabric is particularly useful when air permeability and resistance to liquid and bacteria strikethrough are desired in a fabric having aesthetic qualities similar to a woven fabric. This patent teaches that it is essential that the composite fabric contain at least two microfine fiber plies to achieve the unique air permeability/liquid and bacteria strikethrough resistance relationships that are desired.

The product of the instant invention includes an integrated mat of microfine fibers and a thermoplastic nonwoven fabric wherein the composite has the directional stability, uniform opening size and aesthetic properties of a woven fabric. This product has advantageous aesthetic qualities which are not obtainable in the products of the prior art which contain a layer of film. The instant product also has porosity control which is not obtainable in constructions which are reinforced by spunbonded scrims containing nonuniform openings.

SUMMARY OF THE INVENTION

This invention includes a nonwoven fabric-like material including one or more integrated mats of generally discontinuous thermoplastic polymeric microfibers and one or more layers of nonwoven continuous, linearly oriented thermoplastic netting having uniform network structure. The integrated mat includes randomly laid discontinuous filaments having an average filament diameter of not more than about thirty microns and having a basis weight of between about ten and about fifty grams per square meter. The netting and the mat are bonded together to form a highly useful multi-layer nonwoven fabric. The melt-blown microfine fiber mat contributes fibrous quality, excellent filtration characteristics and opacity to the composite while the nonwoven thermoplastic netting provides strength, porosity control and simulation of the directional pattern of woven textiles.

DESCRIPTION OF THE INVENTION

Figure 1:
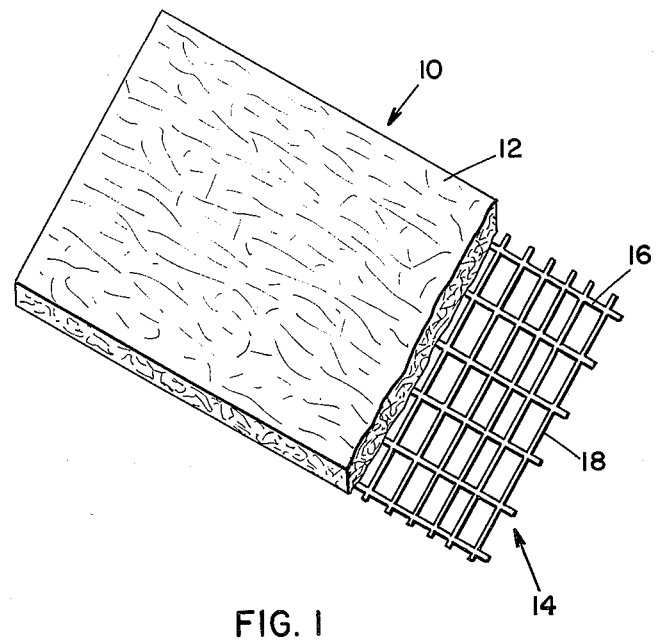
FIG. 1 is a schematic fragmentary perspective view, with sections broken away, of a material embodying the features of this invention.

Referring to the drawings in detail, there is illustrated in FIG. 1 a two ply nonwoven fabric 10 in the form of a laminate which is a product of this invention. The embodiment of FIG. 1 depicts a melt-blown polypropylene microfiber mat 12 and a directionally oriented thermoplastic netting layer 14. Netting layer 14 has main filaments 16 and tie filaments 18.

To provide a relatively soft, general purpose nonwoven fabric, especially suited for application as a wrapping material for surgical kits known as central supply room wrap, the lamination can be discontinuous. The discontinuous or spot bonded lamination can be provided by using an engraved pressure roll with a smooth backup roll. For continuous surface lamination, a smooth pressure roll is used with a smooth backup roll.

Figure 2:
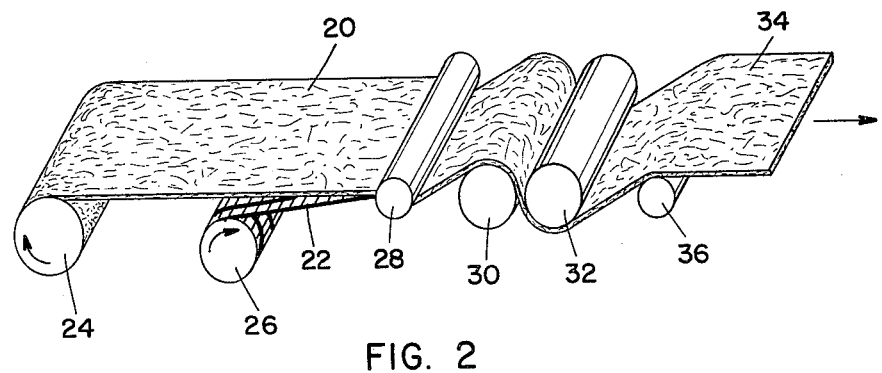
FIG. 2 is a schematic perspective view illustrating apparatus for making fabric structures in accordance with the principles of the subject invention.

Combining the layers 12 and 14 in a continuous manner, can provide a product like paperboard that is suitable for various medical packaging applications. FIG. 2 shows schematically one manner of continuously preparing the two-ply nonwoven fabric shown in FIG. 1. In FIG. 2, there is shown a melt-blown microfiber mat 20 and a thermoplastic netting layer 23 being fed from supply rolls 24 and 26, respectively. Guide roll 28 is used to advance mat 20 and netting layer 27 into contact with heated pressure roll 30 and backup roll 32. If discontinuous lamination is desired, one of the rolls 30 and 32 will have an engraved surface and the other roll will have a smooth surface. Preferably, pressure roll 30 will have the engraved pattern. If continuous lamination is desired, rolls 30 and 32 should have smooth surfaces. The smooth rolls can have an elastomer covering such as silicone, fluorocarbon or another type with Durometer hardness of approximately 60 to 80. The laminated nonwoven fabric 34 is then passed over guide roll 36 to a take-up spool (not shown). Optionally, the laminate 34 can be passed over cooling rolls after leaving roll 32 to lower the temperature of the nonwoven fabric prior to reaching a take-up spool, especially if a high rate of lamination is desired. Also, radiant heating or additional heating rolls can be used near the position of guide roll 28 to raise the temperature of mat 20 and netting layer 22 to the required bonding temperature before reaching rolls 30 and 32. This optional approach is desirable for reaching higher throughput rates with satisfactory lamination than would be affordable with the relatively limited surface contact of a single heating station provided by nip rolls 30 and 32. The operating temperature of rolls 30 and 32 should be adjusted to a surface temperature such that the laminate components, mat 20 and netting layer 22, will reach their respective softening points, but will not reach their crystalline melting point at the desired throughput, i.e., rate of production. Bonding of the layers 20 and 22 can be further facilitated by prior oxidative treatment of the layers, such as by high voltage discharge or flame applied to the surfaces to be bonded.

Figure 3:
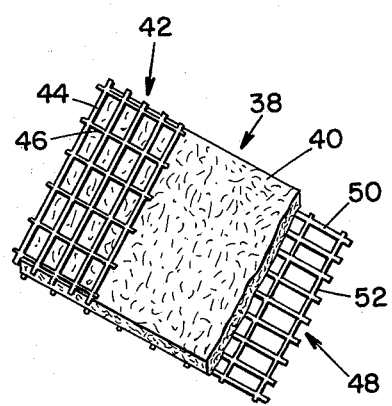
FIG. 3 is a fragmentary perspective view, with sections broken away, showing an additional embodiment of the present invention.

FIG. 3 shows another embodiment of the subject invention where a three-ply structure 38 is shown. The inner layer 40 represents a melt-blown microfiber mat. Outer layer 42 is a layer of thermoplastic nonwoven netting having main filaments 44 and tie filaments 46 which are orthogonal to filaments 44. The other outer layer 48 also consists of thermoplastic nonwoven netting. Layer 48 has main filaments 50 and tie filaments 52, which are orthogonal to filaments 50. Outer layers 42 and 48 are orthogonally oriented with respect to each other wherein, for example, the main filaments 44 of outer layer 42 are at a ninety-degree angle to the main filaments 40 of outer layer 48. Since the main filaments of the nonwoven netting layers may have higher strength properties as compared to the respective tie filaments, the orientation of layers 42 and 48 in laminate structure 38 can provide substantially enhanced strength characteristics in both machine and cross-machine directions.

Figure 4:
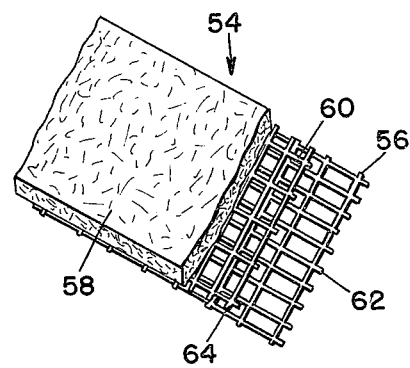
FIG. 4 is a fragmentary perspective view, with sections broken away, showing still another embodiment of the present invention.

FIG. 4 shows still another embodiment of the subject invention wherein three-ply structure 54 has outer layers of nonwoven netting 56 and melt-blown microfine mat 58 and an inner layer 60 of nonwoven netting. As shown in FIG. 4, the main filaments 62 of the layer 56 are orthogonal to the main filaments 64 of the inner layer of nonwoven netting 60. Correspondingly, the tie filaments of layer 60 are also orthogonal to the tie filaments of layer 56.

Other combinations of nonwoven netting layers and microfine mat layers are within the scope of the subject invention. For example, it may be desirable to have a three-ply composite with a mat of melt-blown microfine fibers on each side and a layer of thermoplastic nonwoven netting between the mats, thereby adding the required strength and stability to the composite.

Figure 5:
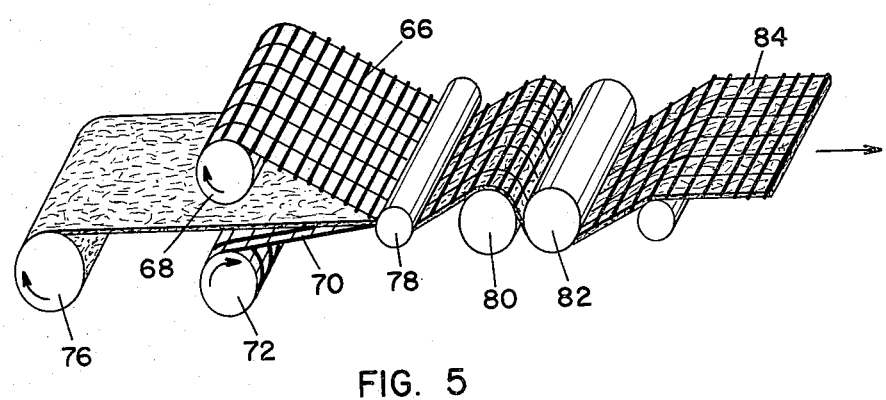
FIG. 5 is a schematic perspective view illustrating other apparatus for making fabric structures in accordance with the principles of the subject invention.

FIG. 5 shows, schematically, a process which can be used for the manufacture of nonwoven fabrics shown in FIGS. 3 and 4. If a structure similar to that of FIG. 3 was desired, netting layer 66 would be supplied from supply roll 68. Netting layer 70, having its main and tie filaments at a ninety degree angle to the main and tie filaments of layer 66, respectively, is fed from supply roll 72. Thermoplastic melt-blown mat 74 is fed from supply roll 76 to form the inner component of the laminate. The three layers pass over guide roll 78, into the nip of heated pressure roll 80 and backup roll 82 wherein the three layers are bonded together, either continuously, using smooth rolls 80 and 82 or discontinuously, where spot-bonding is provided by the embossing on preferably engraved roll 80. The laminated fabric then is fed to a take-up spool (not shown).

The melt-blown mat, as used in this invention, consists of randomly laid discontinuous filaments ranging from less than 1 micron to about 30 microns in diameter. The integrated mat can be prepared by known techniques such as is taught in the article entitled SUPERFINE THERMOPLASTIC FIBERS by Van A. Wente, appearing in Inudstral Engineering Chemistry, Volume 48, Number 8, August, 1956, pp. 3142-3146, or disclosed in U.S. Pat. No. 3,849,241 to Buntin et al.

The melt-blown microfiber mats disclosed herein may be made from a wide variety of thermoplastic polymers. In addition to polypropylene, polyethylene, polyamides, polycarbonates, polyesters, acrylic polymers, fluorocarbon polymers or other thermoplastic materials which have a suitable viscosity for melt-blowing may be used. Modacrylic polymers, which are fire resistant, may also be used for special applications where fire retardancy is required.

The oriented netting or network structures used in this invention may be of the types disclosed in the following patents: Mercer (U.S. Pat. Nos. 4,020,208 and 4,059,713); Larsen (U.S. Pat. No. 4,152,479); Kim et al (U.S. Pat. Nos. 3,914,365 and 4,144,368); and Liu (U.S. Pat. 4,140,826).

This netting may be either a polypropylene homopolymer, a propylene-ethylene (2 to 50% by weight) copolymer, or other polymers of choice, and may be either natural or pigmented. Preferably, the netting should have uniform network structure.

One type of thermoplastic netting useful in this invention is disclosed in U.S. Pat. No. 4,207,375 to Kim et al, incorporated herein by reference. This patent discloses single layer network structures having oriented parallel continuous main filaments extending in one direction, with uniform cross-sections and discontinuous parallel tie filaments extending in another direction, wherein the tie filaments interconnect the main filaments without any substantial portion of the tie filaments crossing over the main filaments. Also, each of the tie filaments between each pair of adjacent main filaments has its longitudinal axis in axial alignment with the longitudinal axis of the adjacent tie filament.

Another type of thermoplastic netting useful in this invention consists of two sets of parallel continuous filaments in two different planes and in two different directions. The two sets of filaments are an example of nonwoven fabrics consisting of thermoplastic netting bonded together. The two sets of continuous filaments can be of the same weight and strength, or one set of filaments may provide most of the weight and strength, while the other set of filaments act as cross or tie filaments. The filaments can range in size from 5 to 400 microns in diameter and the pore openings therebetween can range from 1 to 6,000 microns in largest dimension.

Where discontinuous lamination is desired, one of the pressure rolls used in the lamination process can be engraved. The embossing roll pattern should be designed to provide a spot-bonded effect which will in turn result in softness, foldability and aesthetically pleasing surface formations.

Having set forth the general nature of the invention, the following examples illustrate some specific embodiments of the invention. It is to be understood however, that this invention is not limited to these examples since the invention may be practiced by the use of various modifications.

EXAMPLE 1

A fibrous mat of melt blown polypropylene microfibers was placed between two layers of directionally oriented thermoplastic netting having uniform network structure similar to the structure shown in FIG. 3. The mat of melt-blown thermoplastic microfibers, made by Riegel Products Corporation, Milford, New Jersey, weighed 30 grams per square meter and contained fibers ranging from approximately 1 to approximately 30 microns in diameter. The thermoplastic netting used, sold by Hercules Incorporated, Wilmington, Delaware, was made from a copolymer of propylene with 25% ethylene. One of the polypropylene netting layers had its heavier, stronger filaments in the machine direction while the other netting layer had the same size filaments but had its heavier, stronger filaments oriented in the cross machine direction as shown in FIG. 5. The heavier filaments in each of these types of netting were of approximately 100 micron diameter while the lighter, tie filaments in each of the netting layers were approximately 10 microns in diameter.

The three-layer composite was heated by contact on the surface of an engraved steel roll for approximately two (2) seconds at a surface temperature of approximately 270° F. The composite was then nipped between the engraved roll and a silicone-rubber covered steel backup roll, heated to surface temperature of 150° F., at 48 lbs per linear inch of nip pressure.

The embossing pattern of the engraved roll used for this lamination contained 178 dots per square inch, with about half of the dots of 40 mil diameter, and the remaining half having a diameter of about 25 mils. The dots were uniformly spaced in a geometric pattern with a minimum distance of 10 mils between dots.

The laminated product had physical properties as listed for Example 1 in Table I. This product had sufficient permeability for gas sterilization and sufficient thermal stability for autoclave sterilization at 270° F.

The laminated product also met the requirements for bacteria hold-out for a hospital central supply room wrap for routine wrapping of surgical implement packs or kits.

EXAMPLE 2

A laminate similar to that made in Example 1 was produced with the following exceptions: The two layers of thermoplastic netting were pigmented white; in the laminating process the two layers of thermoplastic netting were placed together as shown in FIG. 4 and against the hot roll surface; and the melt blown thermoplastic microfiber mat was pigmented blue.

The composite resulting in this case had the mat of thermoplastic microfibers bonded to one side of two layers of the thermoplastic netting, instead of being placed between the thermoplastic netting as it was done in Example 1. This construction had the unique advantage of a "tamper-proof" central supply room wrap. When surgical instruments are wrapped with this laminate and the wrapping is sealed with adhesive tape applied to the colored microfine fiber mat, the package cannot be opened without lifting the tape together with the tell-tale pigmented layer of melt-blown mat which will be under and adhering to the adhesive of the tape.

EXAMPLE 3

In this example a mat with white pigmented thermoplastic microfibers similar to the mat used in Example 1 was placed between two layers of thermoplastic netting which were made from a polypropylene homopolymer. The three-layer composite was heated and laminated as in Example 1, except that in this example both pressure rolls had a smooth surface. A continuously bonded laminate resulted which had properties as shown in Table 1. Although the melt-blown thermoplastic microfiber mat was of the same type as used in Example 1, in this example, the thermoplastic netting was of homopolymer polypropylene. Also the main filaments in the two layers of thermoplastic netting had a diameter of approximately 150 microns and the tie filaments had a diameter of approximately 10 microns. The results of the tests performed on the laminate of this example are also shown in Table I. The laminated product was dimensionally stable in steam sterilization at 270° F. and was satisfactory as a barrier to bacteria penetration for useage as a lid material for surgical instrument packaging trays and as a component for pouch packaging.

EXAMPLE 4

A two-ply nonwoven fabric was made similar to the structure shown in FIG. 1, having a mat of polypropylene microfibers and a layer of polypropylene homopolymer netting. The netting layer had a rectangular pattern, with the main and tie filaments having cross-sectional diameters of approximately 150 microns. This example illustrates a simple two-ply, lightweight, economical wrapping material.

EXAMPLE 5

This five-ply laminate illustrates a construction which combines a high strength reinforcing scrim with polypropylene netting on both exterior surfaces, in part to provide protection against linting. The laminate includes an inner layer of polypropylene homopolymer reinforcing scrim having an original basis weight of approximately 0.53 ounces per square yard. On each side of the inner scrim layer is placed a layer of thermoplastic microfibers similar to those used in Example 1. The cover layers of the laminate are polypropylene homopolymer netting having uniform size openings. The expected properties for such a netting are shown in Table 1.

EXAMPLE 6

This two-ply laminate, having a structure similar to that shown in FIG. 1, illustrates the use of 0.3 ounce per square yard polypropylene netting, known as Conwed SX-2086 (available from the Conwed Corporation of Minneapolis, Minnesota). This netting has 12 and 14 strands per inch, in the machine and transverse direction, respectively, and has quadrangular shaped openings.

EXAMPLE 7

This two-ply composite has netting similar to that used in Example 6, except that the openings are diamond-shaped and the reinforcing strands are diagonal to the main filaments.

The capability of steam sterilization of the laminates of this invention is a unique feature. Many of the prior art materials which would otherwise be very useful for sterile wrapping applications cannot withstand temperatures approaching 270° F. Nonwoven fabric laminates, made of polypropylene in accordance with this invention, can withstand the required temperatures for steam sterilization. This property renders materials made in accordance with this invention very useful for the wrapping and subsequent high temperature sterilization of surgical utensils.

The thermoplastic netting materials used as components of the instant invention contribute to another significant advantage over the prior art. Some prior art products are reinforced by means of spun-bonded fabrics which are nonuniform in sizes of openings. The variation for a dimension of opening size can range from thermal insulating liners for garments, gloves, boots and the like.

It is to be understood that the above description and drawings are illustrative of this invention and not in limitation thereof. As will be evident to those skilled in the art, various modifications can be made in light of the foregoing disclosure and discussion without departure from the spirit or scope of the disclosure or from the scope of the claims.

TABLE I

| Example No. | Basis Weight Oz./Yd.$^2$ | Thickness Mils | Strip Tensile Strength, Lbs./in. MD/TD | Edge Tear Strength, Lbs. MD/TD | Mullen Burst psi | Frazier Air Permeability Ft.$^3$/Min./Ft.$^2$ |
|---|---|---|---|---|---|---|
| | | | (a) | (b) | (c) | (d) |
| 1 | 1.7 | 13 | 5.6/8.9 | 9.5/11.5 | 22 | 38 |
| 2 | 1.7 | 14 | 6.1/7.6 | 9.5/8.9 | 22 | 56 |
| 3 | 2.2 | 8 | 15.9/16.7 | 16.5/18.0 | 38 | 13 |
| 4 | 1.5 | 11 | 5/6 | 8/9 | 18 | 60 |
| 5 | 2.3 | 19 | 23/26 | 30/33 | 45 | 10 |
| 6 | 1.5 | 8 | 5/6 | 7/9 | 21 | 45 |
| 7 | 1.5 | 9 | 5/7 | 8/9 | 23 | 56 |

(a) ASTM D1682, Part 24
(b) ASTM 827-67
(c) ASTM D751-68, par. 32, proc. 1
(d) ASTM D736-75
MD = Machine direction
TD = Transverse direction negligible up to several hundred mils in the space of a square inch. The preferred nonwoven linearly oriented thermoplastic netting materials used in the instant invention have a variation in dimensions of size opening of less than 5% over hundreds of square yards. The uniform opening size, contributed prior to lamination by the plastic netting, gives assurance of a certain minimum coverage capability for the combination with a layer of microfine fibers. In prior art products consisting of two inherently nonuniform components, e.g., spun-bonded and melt-blown mat, low coverage segments in each component can occasionally coincide to give areas of poor barrier properties.

The plastic netting of uniform, small opening size, when used on the surface of the fabrics as produced in this invention, provides the capability to substantially prevent the release of lint from the fabric. The net type facings immobilize the microscopic fiber particles which generally migrate from the surface of a fibrous material such as a melt-blown microfiber mat. This lint proofing effect is not attainable from a nonuniform opening size type scrim such as a spun-bonded material. The netting faced fabrics of this invention, when tested by the Gravimetric Dry Lint Method (Parker et al, INDA Tech. Sympos., March 1978) showed less than one-sixteenth of the weight of particulate matter which is released from comparable melt-blown prior art fabrics.

Uniformity of opening size, with its corresponding assurance of a definite minimum opening size, is also important in filtration related applications of the products of this invention. The preferred embodiments of the invention for this application, consisting of polyolefin components, are especially useful as chemically inert filter media.

In addition, the ability to provide a reinforcing scrim which has both high strength and controlled porosity is advantageous in applications which utilize the well known excellent thermal insulating properties of melt-blown, microfibrous mats. The products of this invention can function as nonwettable, inert, lightweight

What I claim and desire to protect by Letters Patent is:

1. A nonwoven fabric-like material comprising at least one integrated mat of generally discontinuous, thermoplastic polymeric microfibers, said mat including randomly laid, discontinuous filaments having an average filament diameter between about 0.5 micron and about 30 microns and having a basis weight of between about 10 and about 50 grams per square meter and at least one layer of nonwoven continuous, linearly oriented thermoplastic netting having at least two sets of strands wherein each set of strands crosses another set of strands at a fixed angle and having uniformly sized openings, said netting and said integrated mat bonded together by heat and pressure to form a multi-layer nonwoven fabric of substantially uniform thickness.

2. A nonwoven fabric-like material comprising
at least one layer of a network structure having a plurality of parallel continuous main filaments extending in a first direction and having a substantially uniform cross-section and being substantially uniformly and continuously oriented, and a plurality of discontinuous parallel tie filaments extending in a second direction different from said first direction, said tie filaments interconnecting said main filaments and having no substantial portion thereof crossing over said main filaments, each of said tie filaments between each pair of adjacent main filaments having its longitudinal axis in said second direction in axial alignment with the longitudinal axis in said second direction of the adjacent tie filament;
and an integrated mat of generally discontinuous thermoplastic polymeric microfibers, said mat including randomly laid discontinuous filaments having an average filament diameter of between about 0.5 micron and about 30 microns and having a basis weight of between about 10 and 50 grams per square meter;
said thermoplastic netting and said integrated mat being bonded together by heat and pressure to form a multi-layer nonwoven fabric of substantially uniform thickness.

3. The nonwoven fabric-like material of claims 1 or 2 including one integrated mat of generally discontinuous, thermoplastic, polymeric microfibers bonded to a single layer of nonwoven, continuous, linearly oriented thermoplastic netting.

4. The nonwoven fabric-like material of claim 3, having an additional layer of nonwoven, continuous, linearly oriented, thermoplastic netting bonded to said integrated mat of polymeric microfibers.

5. The nonwoven fabric-like material of claims 1 or 2 wherein discrete bond regions are present in a density of about 100–500/in$^2$.

6. The nonwoven fabric-like material of claims 1 or 2 wherein said integrated mat and said layers of netting are bonded together in intermittent discrete bond regions.

7. The nonwoven fabric-like material of claims 1 or 2 wherein said thermoplastic polymeric microfibers and said linearly oriented thermoplastic netting are made of polypropylene.

8. The nonwoven fabric-like material of claims 1 or 2 wherein said layer of thermoplastic netting and said polymeric microfiber mat are continuously bonded.

9. The nonwoven fabric-like material of claims 1 or 2 wherein the filaments of said thermoplastic netting have higher strength along the direction of the main filaments than in the direction of the tie filaments.

10. The nonwoven fabric-like material of claims 1 or 2 wherein the ratio of cross-sectional area of main filaments of the thermoplastic netting to the tie filaments is at least 1.5:1.

* * * * *